Patented July 15, 1947

2,423,841

UNITED STATES PATENT OFFICE 2,423,841

METHOD OF MAKING MAGNESIA INSULATION

Alan R. McGarvey, Manheim Township, Lancaster County, and Conral C. Callis, Penn Township, Lancaster County, Pa., assignors to Armstrong Cork Company, Lancaster, Pa., a corporation of Pennsylvania No Drawing. Application August 14, 1946, Serial No. 690,606

6 Claims. (Cl. 106—85)

This application is a continuation in part of application Serial No. 441,381, filed May 1, 1942, and entitled, Method of making magnesia insulation.

This invention or discovery relates to magnesia insulation and more particularly to a method of making the same whereby the setting time of the magnesia insulation composition is greatly accelerated and a harder product having greater structural strength is produced.

The invention relates especially to magnesia insulation of the type known to the art as 85% magnesia and particularly to that type of insulation prepared according to the method set forth in the copending application of Alan R. McGarvey, Serial No. 441,380, filed May 1, 1942, as a continuation in part of a then copending application of Alan R. McGarvey, Serial No. 385,612, filed March 28, 1941, said application Serial No. 441,380 having matured into Patent No. 2,409,297 on October 15, 1946. According to this application, insulating material having increased hardness and strength can be made by a simple direct process without subsequent removal of water before molding the product. The process may be controlled so that no bicarbonate of magnesium is formed even after excessive carbonation. The materials resulting from this process do not exhibit the brittleness and fragility inherent in the magnesia insulating materials such as have been heretofore produced by methods known to the art.

In accordance with the invention of the copending application of Alan R. McGarvey, Serial No. 441,380, filed May 1, 1942, by carbonating a relatively concentrated slurry of magnesium oxide or magnesium hydroxide, either a tabular plate-like or fine needle-like crystalline form of normal magnesium carbonate having self-setting properties can be produced by properly controlling the conditions of carbonation so that the temperature within the reacting mass remains as close to room temperature as possible and in no case attains a temperature above about 100° F. and preferably remains at least as low as 75° F. to 85° F.

When following this method, substantially no magnesium bicarbonate is formed, no matter how excessive the carbonation, when slurries having a dilution range from about 9 parts up to about 14 parts by weight of water to one part by weight of magnesium oxide are treated with dilute carbon dioxide gas, whereas when greater dilutions are employed magnesium bicarbonate is formed immediately upon the occurrence of excessive carbonation and increases in amount steadily upon the continuation of such excessive carbonation. By excessive carbonation is meant the continued introduction of carbon dioxide into the slurry after tests show that the slurry contains dissolved therein only so much magnesium as corresponds to the solubility of the normal magnesium carbonate under the operating conditions of temperature and pressure.

According to this invention, more concentrated magnesium oxide slurries are employed and preferably a slurry having a dilution of from about 12 to 13 parts of water to one part of magnesium oxide. When such concentrations are utilized, the difficulties involved in avoiding excess carbonation and the necessity to add alkaline materials to neutralize whatever bicarbonate is formed are eliminated. Furthermore, the step of washing out the bicarbonate by removing water from the slurry at the end of the carbonation and the consequent necessity to resuspend the mass of crystals in a fresh supply of water may be eliminated. While the procedure involving reconstituting the crystals in a fresh slurry may be employed, such a procedure is preferably avoided since the elimination of the agitation needed to resuspend the crystals results in the production of a stronger and harder final block having increasingly lighter densities and higher insulating capability. The concentration of the slurries may be greater or lesser than 12 to 13 parts of water to one part of magnesium oxide, for example, a concentration of 10 to 1 or 14 to 1 may be employed. However, as the slurries become more concentrated, a material having a relatively higher density is obtained. When a concentration of 9 to 1 is reached, the material obtained is too dense to be commercially practical. On the other hand, when less concentrated slurries are utilized, the materials obtained tend to become lighter and more fragile. When a concentration of above 14 to 1 is reached, the bicarbonate is formed in excessive amounts causing fissures and gas pockets in the final product. Magnesium oxide can be added to neutralize the bicarbonate, but such a procedure results in the production of a softer block than is desirable.

The preferred procedure, therefore, involves the elimination of the step of removing the water present during the carbonation and that of resuspending the crystals in fresh water. By proceeding in this manner it is possible to predetermine the final density of the molded insulating material by controlling the amount of the water used at the start of the carbonation; the more water used, the lighter the final molded material. However, in those cases in which these two steps are not eliminated, the final density of the block can be controlled by adjusting the amount of water in the step of resuspending the crystals.

The employment of more concentrated slurries as specified above eliminates the formation of sheaves of crystals which occurs generally with the greater dilutions of the prior art. The presence of a large number of sheaves results in a denser block of weaker structure.

When the prevailing temperature throughout the carbonation does not exceed 50° F., the tabular or plate-like crystals predominate in the product, while if a temperature of about and not in excess of 70° F. prevails, the crystalline product comprises about 50% of the tabular crystals and about 50% of the needle-like crystals. At temperatures of about 74° F. or higher, no tabular crystals are produced. For the purposes of the invention, it is considered immaterial whether the tabular or the needle-like variety of crystals is formed in the process of carbonation, since it has been found that, even in those processes starting with the tabular form of crystals alone or in admixture with the needle-like variety, the tabular crystals are gradually converted into the needle-like crystals at temperatures above about 70° F., this conversion occurring with great rapidity at about 123° F. Such conversion occurs in the step during which the slurry of the crystals is heated to cause setting as will be more particularly described hereinafter. For the same reason, the crystals formed in the carbonation process of this invention will be hereinafter referred to as "self-setting" crystals whether they are actually the tabular or the needle-like variety or a mixture of both since both varieties in effect set in the same manner.

However, in all cases it is highly important that the carbonation temperature be prevented from exceeding about 100° F. since it has been found that in the process of this invention, wherein the crystals are formed directly by carbonation of magnesium oxide or hydroxide (without the intervening step of converting all the magnesium into the form of a soluble bicarbonate and then precipitating the self-setting crystals by heating the solution in accordance with a process heretofore employed) the self-setting crystals are partially converted to the form of a basic magnesium carbonate to an appreciable extent at temperatures above about 100° F., apparently because of the fact that the self-setting crystals are formed in the presence of magnesium oxide or hydroxide. This is unexpected in view of the fact that it has been found that no appreciable change to basic carbonate occurs when self-setting crystals are produced in processes involving the heating of magnesium bicarbonate until the temperature approximates 155° F.

It should be noted at this point that the crystals formed in accordance with the process of this invention are much finer in size than such as are produced by heating magnesium bicarbonate solutions, the finer size imparting a greater strength to the final product.

The tabular crystals as well as the needle-like variety, the latter being probably in the rhombic crystallographic class, though some authorities place them in the hexagonal class, can be filtered and dried by acetone at low temperatures without any conversion to a basic carbonate form. Such dried crystals can be stored indefinitely in a dry atmosphere and can then be suspended in water and the suspension will set in the same manner as the carbonate slurries as hereinafter described. The tabular or plate-like crystals formed at low temperatures are probably the pentahydrate of the constitution $MgCO_3.5H_2O$. It is believed that the needle-like self-setting crystals have a composition corresponding to the formula $MgCO_3.3H_2O$. However, there is some authority holding that the composition of the needle-like crystals corresponds to the formula $$Mg(OH).HCO_3.2H_2O$$

Whatever the formula, it is known that such crystals while in the wet condition set slowly and are converted even in the cold to a form of magnesium carbonate entirely lacking the self-setting characteristics of the initially obtained crystals, which, for convenience, will be hereinafter designated by the expression "normal magnesium carbonate trihydrate" or by the corresponding formula, which is the more generally accepted designation of the substance. These crystals also set if subjected to elevated temperatures, above about 100° F., the rate of setting increasing as the temperature increases. Thorough agitation during carbonation, provided the temperature is kept low, favors the formation of the self-setting crystals or of the pentahydrate crystals which are also self-setting apparently by conversion during heating to the needle-like trihydrate crystals. These facts also account for the prior general use of slurries having great dilution, since ordinarily the bubbling of the carbon dioxide gas through the slurry was relied upon to effect agitation thereof. To effect proper agitation to insure the production of the self-setting crystals, it was necessary to use large amounts of carbon dioxide gas, and the use of such a large amount of gas, since the reaction is exothermic, produced an increased amount of heat, the necessity for the absorption and dissipation of which in turn led to the use of a large amount of water during the carbonation.

As stated previously, it is highly important that the temperature of the reaction be kept low and that adequate agitation be provided in the reaction medium. Electrolytic or colloidal substances, such as finely-divided particles of bentonite, may be added to act as nuclei for initiating the crystallization of the normal magnesium carbonate, but since such devices are not necessary for efficient crystallization, it is preferred not to employ them.

While any dilute carbon dioxide may be employed in this process without danger of forming magnesium bicarbonate by excessive carbonation, it is preferred to use a gas which has a relatively low content of carbon dioxide, so that a great quantity of the gas may be passed through the slurry without generating an excessive amount of heat by virtue of reaction of carbon dioxide with magnesium oxide.

By using such a dilute gas, thorough agitation of the reacting mass is effected, while, at the same time, the increased concentration of magnesium oxide is offset by the dilute concentration of the carbon dioxide, thereby effecting a proportionately greater amount of agitation for a given weight of carbon dioxide introduced into the reaction medium. Furthermore, the passage of the inert gases not taking part in the reaction through the reaction medium also assists in the dissipation, by convection and conduction, of the heat generated by the reaction. Any form of dilute carbon dioxide-containing gas is suitable, and as sources of such gases, there may be mentioned cooled stack gases, the gases resulting from commercial alcohol processes, etc. The gas may be artificially produced. For example, carbon dioxide from a relatively concentrated source may be mixed with air or other available inert gas. This mixing may be effected just prior to introduction of the gas into the reaction medium by any suitable means, such as by means of an injector in which the passage of a stream of carbon dioxide flowing at high velocity is caused to entrain air just outside the reaction vessel. Similarly, a gas of relatively high concentration of carbon dioxide can be introduced into the reaction medium in close proximity to the point of introduction of inert gases, such as air, nitrogen, etc. While it is preferred to use a dilute carbon dioxide-containing gas, yet a relatively concentrated carbon dioxide-containing gas may be employed without excessive rise in temperature and without the formation of magnesium bicarbonate by excessive carbonation, provided it is introduced at a relatively slow rate. However, this involves a loss of time and, to obtain the best results, practically necessitates the employment of additional agitation, either by the introduction of an inert gas or by mechanical means. While a water jacket may be provided upon the apparatus for carbonating the slurry, it is preferred to avoid entirely any necessity to lower the reaction temperature by such means by properly controlling the conditions within the reaction system as aforesaid. The preferred embodiment of our invention, therefore, employs a dilute carbon dioxide-containing gas which functions not only by reacting with the magnesium oxide or magnesium hydroxide of the slurry to produce the desired self-setting crystals, but also by dissipating the heat and by agitating the reaction mass thereby eliminating the necessity of supplying the reaction vessels with water jackets and agitating means of a mechanical nature.

While the product obtained from the setting of the self-setting crystals alone is suitable as a heat insulating medium, additional strength is obtained by incorporating therein from 10% to 15% of fibers, such as asbestos. The fibers may be added to the mixture in the carbonator just prior to the end of the time necessary to substantially completely convert the initial content of magnesium oxide to the self-setting crystals. For example, the addition may be made at any time after the conversion of at least about 95% of the magnesium oxide to the self-setting crystalline form has taken place. The mixture may thereupon be made intimate by the agitation involved in completing the carbonation of the initial magnesium oxide content of the slurry. Alternatively, the fibers may be incorporated into the completely converted slurry of self-setting crystals in a separate agitator operated mechanically or by means of the bubbling of the gas therein.

The mixture so prepared either in the carbonator in a separate mixing vessel, may be molded immediately, or in a preferred mode of procedure, may be first preheated to a temperature not in excess of 140° F. This preheating may occur in the carbonator in which case the water jacket may be supplied with hot water or with steam, or the preheating may be applied simultaneously with the mixing of the fibers into the self-setting crystal slurry, either in a carbonator or in a separate mixer.

The composition, whether preheated or not, is preferably molded by pouring it into forms having the desired shape, which are then subjected to an elevated temperature of about 180° F. until the mass has taken a preliminary set. The setting of the slurry of crystals is preferably allowed to take place while the mass in the molds is in a quiescent state and subjected only to the normal pressure of the atmosphere. If increased density in the product is desired, the composition may be allowed to set in the form of pressed cakes obtained after the composition has had any desired amount of water removed therefrom by a filter press or by any other means. The self-sustaining blocks resulting from the preliminary set in the molds may be removed therefrom and subjected to a final drying, which may take place advantageously at temperatures within the range from about 200° F. to 400° F.

We have found that the properties of insulating material prepared as outlined above may be greatly improved by the incorporation into the material of a small amount of a water-repellent substance. Not only are the physical properties of the material, that is, the properties of hardness and strength, improved, but the incorporation of a water-repellent substance into the slurry results in an acceleration of the setting time of the normal magnesium carbonate crystals.

Among the water repellent substances which we have found to impart the surprising characteristics to the magnesia compositions, we may mention as examples rosin, aluminum resinate, zinc resinate, stearic acid, zinc stearate, aluminum stearate, emulsified asphalt, wax, and other similar water-repellent substances. The water repellents may be added to the compositions as such or they may be formed in situ, for example, a water soluble soap such as a sodium stearate, rosin soap, ammonium stearate, or tung oil fatty acid soap may be added and thoroughly mixed into the wet mix of self-setting crystals, and to the mix may be then added a salt, such as alum or zinc sulfate, dissolved in water. The wet mix may be then molded, and during the molding step a water-insoluble soap such as aluminum stearate or zinc stearate is formed.

In our parent application Serial No. 441,381, of which this application is a continuation in part, we have claimed the method in which water-insoluble soaps are employed to accelerate the setting time of the normal magnesium carbonate crystals. In our divisional application, Serial No. 690,607, filed August 14, 1946, we have claimed the method in which the water-repellent material is selected from the group consisting of asphalt and wax.

The water-repellent substances are added to the slurry of magnesium carbonate and water in comparatively small amounts. We have obtained particularly advantageous results when 5% to 30% by weight, based on the weight of the magnesium oxide, of water-repellent material is incorporated in the mix. As the examples which follow indicate, the quantity of water-repellent substances which may be incorporated can be varied.

These materials may be added either to the slurry of MgO in water before carbonation or, and more advantageously, they may be added to the carbonated slurry immediately after completion of the carbonation step and before subjecting the wet mix to the molding operation. When the latter procedure is followed, there is no tendency for the water-repellent materials to interfere with the carbonation of the magnesium oxide slurry.

The following specific examples are given as illustrations of certain specific embodiments of our invention:

Example 1

A slurry containing 23.5 pounds of magnesium oxide and 292 pounds of water was introduced into a carbonator and a gas containing air and 50% by volume of carbon dioxide was passed through the slurry for a period of one hour and thirty minutes, the temperature during the carbonation attaining but not exceeding 85° F. Six pounds of asbestos fibers were then added, and the carbonation was continued only sufficiently to obtain an intimate mixture of the fibers and the slurry of magnesium carbonate crystals. To the mixture so formed was then added 12 pounds of stearic acid and 12 pounds of a 10% solution of ammonia. This represents about 51% of water-repellent material based on the weight of the MgO content of the slurry. The wet mix was then agitated for a short period of time to obtain thorough mixing of the ingredients, and then poured into molds, which were heated to 180° F. to preliminarily set the the slurry in the forms. The composition took a preliminary set in about 15 minutes. After this time, the set forms were removed and dried at 280° F. for a period of about 20 hours. The finished block had a density of 12 pounds per cubic foot and was unusually firm, hard and strong. The stearic acid and ammonia solution may be added to the carbonator as such or may be formed into a stearic acid emulsion prior to introduction into the carbonator.

Example 2

A slurry containing 23.5 pounds of magnesium oxide and 292 pounds of water was introduced into a carbonator and a gas containing air and 50% by volume of carbon dioxide was passed through the slurry for a period of one hour and twenty minutes, the temperature during carbonation attaining but not exceeding 85° F. Eight pounds of asbestos fibers were then added and the carbonation was continued only sufficiently to obtain an intimate mixture of the fibers in the slurry of magnesium carbonate crystals. A water-repellent material was formed in the following manner: Fifty parts by weight of stearic acid and 70 parts by weight of water were heated to about 80° C. To this mixture was added sufficient ammonium hydroxide to form about 25% of ammonium stearate, which served as an emulsifying agent to carry the remaining 75% of stearic acid. Six parts by weight of this stearic acid emulsion and ½ of a gallon of asphalt emulsion (about 4 pounds) containing 2½% by weight clay, 39½% by weight water, and 58% by weight asphalt were added to the carbonated slurry. This represents about 20% of water-repellent material based on the weight of the magnesium oxide content of the slurry. The wet mix was then agitated for a short period of time to obtain thorough mixing of the ingredients. The batch was then poured into molds, which were heated to 180° F. to preliminarily set the slurry in the molds. The composition took a preliminary set in about fifteen minutes. During the preliminary setting period, the asphalt emulsion broke and the ammonia was driven off from the stearic acid emulsion, thus forming a water-repellent composition consisting essentially of asphalt and stearic acid. After the initial setting, the forms were removed and the product dried at 280° F. for a period of about 20 hours. The finished block had a density of 12 pounds per cubic foot, and was unusually firm, hard, and strong.

It is to be noted that by following the identical processes given in the above examples with the exception that no water-repellent material is added to the wet mix, a composition is formed which requires at least twenty minutes to develop a preliminary set at the same setting temperatures.

The products obtained by following the method of our invention have a glossy surface and are unusually hard, firm, and strong when considering their extremely light weight. The blocks or other bodies formed in accordance with our invention by quiescent setting without pressure and weights averaged from about 7 to 12 pounds per cubic foot. The products have a very low coefficient of heat conductivity, the structure of the blocks being highly cellular though the greater proportion of the cells are too small to be readily visible to the naked eye. The self-setting crystals formed by the method of our invention are slowly converted, even in the cold, to basic magnesium carbonate. This setting is accelerated by the addition of heat, and, because of the addition of the water-repellent material, the composition develops a set much faster than any of the "85%" magnesia compositions of the prior art.

While the invention has been disclosed in terms of specific examples employing certain materials and definitely stated proportions, we do not intend to be limited thereby, but the invention may be otherwise embodied and practiced within the scope of the appended claims.

We claim:

1. In the method of making molded basic magnesium carbonate compositions by carbonating a slurry of a magnesium compound selected from the group consisting of magnesium oxide and magnesium hydroxide, the initial concentration of the slurry being such that there are from about 9 to about 14 parts by weight of water for each part of said magnesium compound based on its MgO content, to form a slurry of self-setting normal magnesium carbonate crystals, the step of introducing into the slurry a water-repellent material comprising stearic acid, said water-repellent material being present in the slurry in an amount equal to about 5% to 50% by weight, based on the MgO content of the slurry, whereby setting of the crystalline slurry formed by carbonation is accelerated.

2. In the method of making basic magnesium carbonate compositions, the steps of forming an aqueous slurry of self-setting normal magnesium carbonate crystals containing about 5% to 50% by weight, based on the weight of the MgO content of the slurry, of a water-repellent material comprising stearic acid and thereafter setting said slurry under the accelerating action of said stearic acid.

3. In the method of making basic magnesium carbonate compositions, the steps of forming an aqueous slurry of self-setting normal magnesium carbonate crystals containing about 5% to 50% by weight, based on the weight of the MgO content of the slurry, of a water-repellent material comprising an emulsion of stearic acid and thereafter setting said slurry under the accelerating action of said water-repellent material.

4. In the method of making basic magnesium carbonate compositions, the steps of forming an aqueous slurry of self-setting normal magnesium carbonate crystals containing about 5% to 50% by weight, based on the weight of the MgO content of the slurry, of a water-repellent material comprising an emulsion of stearic acid and ammonium stearate and thereafter heating said slurry to drive off the ammonia from said ammonium stearate and set said slurry under the accelerating action of said water-repellent material.

5. In the method of making basic magnesium carbonate compositions, the steps of forming an aqueous slurry of self-setting normal magnesium carbonate crystals containing about 5% to 30% by weight, based on the weight of the MgO content of the slurry, of a water-repellent material comprising a mixture of stearic acid and asphalt and thereafter setting said slurry under the accelerating action of said water-repellent material.

6. In the method of making basic magnesium carbonate compositions, the steps of forming an aqueous slurry of self-setting normal magnesium carbonate crystals containing about 5% to 30% by weight, based on the weight of the MgO content of the slurry, of a water-repellent material comprising an emulsion of stearic acid and ammonium stearate and an emulsion of asphalt and clay and thereafter heating said slurry to break said emulsions and set said slurry under the accelerating action of said water-repellent material.

ALAN R. McGARVEY.
CONRAL C. CALLIS.